(12) United States Patent
Chung et al.

(10) Patent No.: US 12,208,463 B2
(45) Date of Patent: Jan. 28, 2025

(54) SECONDARY BATTERY SEALING PROCESS AND SECONDARY BATTERY MANUFACTURING METHOD COMPRISING THE SAME

(71) Applicant: LG Energy Solution, Ltd., Seoul (KR)

(72) Inventors: Joo Young Chung, Daejeon (KR); Won Pill Hwang, Daejeon (KR); Sang Ho Bae, Daejeon (KR); Su Taek Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 69 days.

(21) Appl. No.: 17/924,235

(22) PCT Filed: Aug. 11, 2021

(86) PCT No.: PCT/KR2021/010663
§ 371 (c)(1),
(2) Date: Nov. 9, 2022

(87) PCT Pub. No.: WO2022/035225
PCT Pub. Date: Feb. 17, 2022

(65) Prior Publication Data
US 2023/0173606 A1    Jun. 8, 2023

(30) Foreign Application Priority Data
Aug. 11, 2020 (KR) .......................... 10-2020-0100764

(51) Int. Cl.
*B23K 20/00* (2006.01)
*B23K 20/10* (2006.01)
*H01M 50/183* (2021.01)

(52) U.S. Cl.
CPC ........... *B23K 20/10* (2013.01); *H01M 50/183* (2021.01)

(58) Field of Classification Search
CPC .. B23K 20/10; B23K 2101/38; B23K 31/125; H01M 50/516; H01M 50/548
See application file for complete search history.

(56) References Cited

U.S. PATENT DOCUMENTS 8,460,817 B2 * 6/2013 Rourke ............ H01M 10/0413
29/623.1
2011/0308736 A1 * 12/2011 Scheuerman ........ B23K 20/106
228/44.3

(Continued)

FOREIGN PATENT DOCUMENTS

| CN | 104584259 A | 4/2015 |
| CN | 111341946 A | 6/2020 |

(Continued)

OTHER PUBLICATIONS

Kojima (JP2002184373A) computer English translation (Year: 2024).*

(Continued)

*Primary Examiner* — Erin B Saad
(74) *Attorney, Agent, or Firm* — Lerner David LLP

(57) ABSTRACT

The present invention provides a sealing process for a secondary battery of the present invention, which thermally fuses and seals a sealing portion that extends along an edge surface of a battery case, the sealing process comprising: an arrangement operation of disposing the sealing portion of the battery case between an anvil and a horn; a first region-fixing operation of pressing and fixing a first region of the sealing portion through the anvil and the horn; and a first region-primary sealing operation of applying an ultrasonic wave to the first region of the sealing portion through the horn at a set frequency and a set amplitude for a set time, thereby thermally fusing the first region of the sealing portion.

14 Claims, 16 Drawing Sheets

(56) References Cited

U.S. PATENT DOCUMENTS

| | | | |
|---|---|---|---|
| 2015/0000117 A1 | 1/2015 | Cho et al. | |
| 2017/0288181 A1* | 10/2017 | Hwang | H01M 4/587 |
| 2017/0309871 A1* | 10/2017 | Jo | H01M 50/105 |
| 2017/0315100 A1* | 11/2017 | Cai | G01N 29/045 |
| 2018/0309095 A1* | 10/2018 | Olchawski | H01M 50/117 |
| 2020/0194743 A1 | 6/2020 | Wang et al. | |

FOREIGN PATENT DOCUMENTS

| | | |
|---|---|---|
| JP | H11149910 A | 6/1999 |
| JP | H11224652 A | 8/1999 |
| JP | 2000182577 A | 6/2000 |
| JP | 2001205452 A | 7/2001 |
| JP | 2002184373 A | 6/2002 |
| JP | 2010114041 A | 5/2010 |
| JP | 4956854 B2 | 6/2012 |
| JP | 2017-019544 A | 1/2017 |
| KR | 20080081039 A | 9/2008 |
| KR | 20120102935 A | 9/2012 |
| KR | 101203667 B1 | 11/2012 |
| KR | 20130130935 A | 12/2013 |
| KR | 101453784 B1 | 10/2014 |
| KR | 20150137454 A | 12/2015 |
| KR | 20160111702 A | 9/2016 |
| KR | 20200011228 A | 2/2020 |

OTHER PUBLICATIONS

International Search Report for Application No. PCT/KR2021/010663 mailed Nov. 25, 2021, pp. 1-3.

Extended European Search Report including Written Opinion for Application No. 21856231.2 dated Jul. 24, 2024, pp. 1-10.

* cited by examiner

| | | Comparative Example 1 | Preparation Example 1 | Preparation Example 2 | Comparative Example 2 |
|---|---|---|---|---|---|
| Sample test conditions | Frequency | 10kHz ~ 40kHz | | | |
| | Time | 0.1 seconds or less | 0.35 seconds | 2 seconds | 0.35 seconds |
| | Amplitude | 100% | 100% | 100% | 50% |
| Surface state | | Horn/anvil mark is not present | Horn/anvil mark is present | Horn/anvil mark is present | Horn/anvil mark is not present |
| Adhesion strength (PP layer/PP layer) | | 0 N/mm | 5 N/mm | 3 N/mm | 0 N/mm |

FIG.12

SECONDARY BATTERY SEALING PROCESS AND SECONDARY BATTERY MANUFACTURING METHOD COMPRISING THE SAME

CROSS-REFERENCE TO RELATED APPLICATION

The present application is a national stage entry under 35 U.S.C. § 371 of International Application No. PCT/KR2021/010663, filed on Aug. 11, 2021, which claims priority to Korean Patent Application No. 10-2020-0100764, filed on Aug. 11, 2020, the disclosures of which are hereby incorporated by reference herein in their entireties.

Technical Field

The present invention relates to a secondary battery sealing process for improving a sealing force of a sealing portion in a pouch and a secondary battery manufacturing method comprising the same.

Background Art

In generally, secondary batteries refer to chargeable and dischargeable batteries unlike primary batteries that are not chargeable, and such a secondary battery is being widely used in the high-tech electronic fields such as phones, laptop computers, and camcorders.

The secondary batteries are classified into a can-type secondary battery, in which an electrode assembly is stored in a metal can, and a pouch-type secondary battery, in which an electrode assembly is stored in a pouch. Also, the pouch-type secondary battery comprises an electrode assembly having an electrode tab, an electrode lead coupled to the electrode tab, and a battery case accommodating the electrode assembly in a state in which a front end of the electrode lead is drawn to the outside. Also, the battery case comprises an accommodation portion for accommodating the electrode assembly and a sealing portion formed along an edge surface of the accommodation portion.

Meanwhile, the sealing portion of the battery case in the secondary battery is sealed by using a sealing apparatus for a secondary battery, and the sealing apparatus for a secondary battery seals the sealing portion of the battery case by using ultrasonic waves.

However, a sealing apparatus for a secondary battery according to the related art has a limitation in uniformly sealing the sealing portion of the battery case. That is, in the sealing apparatus for a secondary battery according to the related art, heat is non-uniformly applied to the sealing portion of the battery case, causing failed welding.

DISCLOSURE OF THE INVENTION

Technical Problem

The present invention has been made to solve the above problems. An object of the present invention is to provide a secondary battery sealing process capable of uniformizing heat applied to the sealing portion of the battery case by setting optimal welding conditions when sealing the sealing portion of the battery case, and as a result, welding failures may be prevented. Also, a secondary battery manufacturing method comprising the same is provided.

Technical Solution

To achieve the object described above, a sealing process for a secondary battery of the present invention, which is to thermally fuse and seal a sealing portion that extends along an edge surface of a battery case, comprises: an arrangement operation of disposing the sealing portion of the battery case between an anvil and a horn; a first region-fixing operation of pressing and fixing a first region of the sealing portion through the anvil and the horn; and a first region-primary sealing operation of applying an ultrasonic wave to the first region of the sealing portion through the horn at a set frequency and a set amplitude for a set time, thereby thermally fusing the first region of the sealing portion.

The set frequency may be 10 kHz to 40 kHz, the set amplitude may be 5 μm to 50 μm, and the set time may be 0.1 seconds to 2.0 seconds.

The sealing portion may have a stack structure that comprises a coating layer, a metal layer, and an insulating layer in a direction from the inside of the battery case toward the outside, and a thickness of the coating layer may be 30 μm to 85 μm.

After the first region-primary sealing operation, a first region-secondary sealing operation may be further performed to secondarily thermally fuse the first region of the sealing portion by secondarily applying an ultrasonic wave to the first region of the sealing portion through the horn, wherein the first region-secondary sealing operation is performed under the same ultrasonic wave frequency and set time as the first region-primary sealing operation but under an amplitude reduced by 40% to 60%.

The horn may be rotatable left or right toward the sealing portion and installed to a converter comprising a booster, and may press the entirety of the first region of the sealing portion with a uniform pressure.

The sealing process may further comprise, after the first region-primary sealing operation: a second region-fixing operation of pressing and fixing a second region of the sealing portion, which is spaced apart from the first region, through the anvil and the horn; and a second region-sealing operation of applying an ultrasonic wave to the second region of the sealing portion through the horn at a set frequency and a set amplitude for a set time, thereby thermally fusing the second region of the sealing portion.

The second region-sealing operation may be set to the same ultrasonic wave frequency, amplitude, and time as the first region-primary sealing operation.

The sealing process may further comprise, after the second region-sealing operation: a third region-fixing operation of pressing and fixing a third region of the sealing portion, which is positioned between the first region and the second region, through the anvil and the horn; and a third region-sealing operation of applying an ultrasonic wave to the third region of the sealing portion through the horn at a set frequency and a set amplitude for a set time, thereby thermally fusing the third region of the sealing portion.

An ultrasonic wave frequency, amplitude, and time of the third region-sealing operation may be set to differ from the ultrasonic wave frequency, amplitude, and time of the first region-primary sealing operation.

The ultrasonic wave frequency, amplitude, and time of the third region may be set to be higher than the ultrasonic wave frequency, amplitude, and time of the first region-primary sealing operation.

Meanwhile, a method for manufacturing a secondary battery of the present invention comprises: a manufacturing process of manufacturing an electrode assembly by stacking an electrode and a separator; an accommodating process of accommodating the electrode assembly in a pouch-type battery case; and a sealing process of thermally fusing and sealing a sealing portion that extends from an edge surface of the battery case, wherein the sealing process comprises: an arrangement operation of disposing the sealing portion, which extends along the edge surface of the battery case, between an anvil and a horn; a first region-fixing operation of pressing and fixing a first region of the sealing portion through the anvil and the horn; and a first region-primary sealing operation of applying an ultrasonic wave to the first region of the sealing portion through the horn at a set frequency and a set amplitude for a set time, thereby thermally fusing the first region of the sealing portion.

The set frequency may be 10 kHz to 40 kHz, the set amplitude may be 5 μm to 50 μm, and the set time may be 0.1 seconds to 2.0 seconds.

The sealing process may further comprise a first region-secondary sealing operation of secondarily applying an ultrasonic wave to the first region of the sealing portion through the horn after the first region-primary sealing operation, wherein the first region-secondary sealing operation is performed under the same ultrasonic wave frequency and set time as the first region-primary sealing operation but under an amplitude reduced by 40% to 60%.

The sealing process may further comprise, after the first region-primary sealing operation: a second region-fixing operation of pressing and fixing a second region of the sealing portion, which is spaced apart from the first region, through the anvil and the horn; and a second region-sealing operation of applying an ultrasonic wave to the second region of the sealing portion through the horn at a set frequency and a set amplitude for a set time, thereby thermally fusing the second region of the sealing portion.

The sealing process may further comprise, after the second region-sealing operation: a third region-fixing operation of pressing and fixing a third region of the sealing portion, which is positioned between the first region and the second region, through the anvil and the horn; and a third region-sealing operation of applying an ultrasonic wave to the third region of the sealing portion through the horn at a set frequency and a set amplitude for a set time, thereby thermally fusing the third region of the sealing portion.

Advantageous Effects

The sealing process for the secondary battery of the present invention comprises the arrangement operation, the first region-fixing operation, and the first region-primary sealing operation. The first region-primary sealing operation applies the ultrasonic wave to the first region of the sealing portion, which is provided in the battery case, at the set frequency and the set amplitude for the set time, thereby thermally fusing the first region of the sealing portion. Here, the set frequency may be 10 kHz to 40 kHz, the set amplitude may be 5 μm to 50 μm, and the set time may be 0.1 seconds to 2.0 seconds. Thus, the optimal sealing conditions may be set when the first region of the sealing portion included in the battery case is sealed. Accordingly, the uniformity in heat transfer to the first region of the sealing portion may be enhanced, and as a result, the first region of the sealing portion may be sealed without a failure.

Also, in the sealing process for the secondary battery of the present invention, the first region-secondary sealing operation is further performed. The first region-secondary sealing operation has the same sealing conditions as the first region-primary sealing operation, but is performed in a state in which only the amplitude is reduced by 50%. Thus, air bubbles generated in the sealing portion of the battery case during the first region-primary sealing operation may be effectively discharged and eliminated, and accordingly, the occurrence of failures may be significantly reduced.

BRIEF DESCRIPTION OF THE DRAWINGS

FIG. 12 is a table showing experimental examples of a sealing apparatus for a secondary battery of the present invention.

MODE FOR CARRYING OUT THE INVENTION

Figure 1:
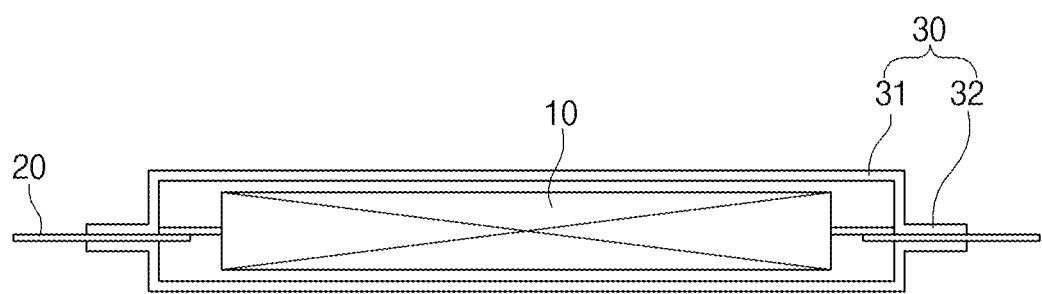
FIG. 1 is a cross-sectional view illustrating a secondary battery according to a first embodiment of the present invention.

Hereinafter, embodiments of the present invention will be described in detail with reference to the accompanying drawings so as to be easily carried out by a person skilled in the art to which the present invention pertains. However, the present invention may be embodied in various different forms, and is not limited to the embodiments described herein. Also, in the drawings, parts irrelevant to the description will be omitted to clearly describe the present invention, and similar elements will be designated by similar reference numerals throughout the specification.

Secondary Battery According to a First
Embodiment of the Present Invention

As illustrated in FIG. 1, a secondary battery according to a first embodiment of the present invention comprises an electrode assembly 10 having an electrode tab, an electrode lead 20 coupled to the electrode tab, and a battery case 30 accommodating the electrode assembly 10 in a state in which a front end of the electrode lead 20 is drawn to the outside.

Also, the battery case 30 comprises an upper case and a lower case. As an accommodation groove of the upper case is connected to an accommodation groove of the lower case, an accommodation portion 31 for accommodating the electrode assembly 10 is formed. As a sealing surface of the upper case is connected to a sealing surface of the lower case, a sealing portion 32 for sealing the accommodation portion 31 is formed.

That is, the battery case 30 comprises the accommodation portion 31, which accommodates the electrode assembly 10, and the sealing portion 32, which extends along an edge surface of the accommodation portion 31 and seals the accommodation portion 31.

Figure 8:
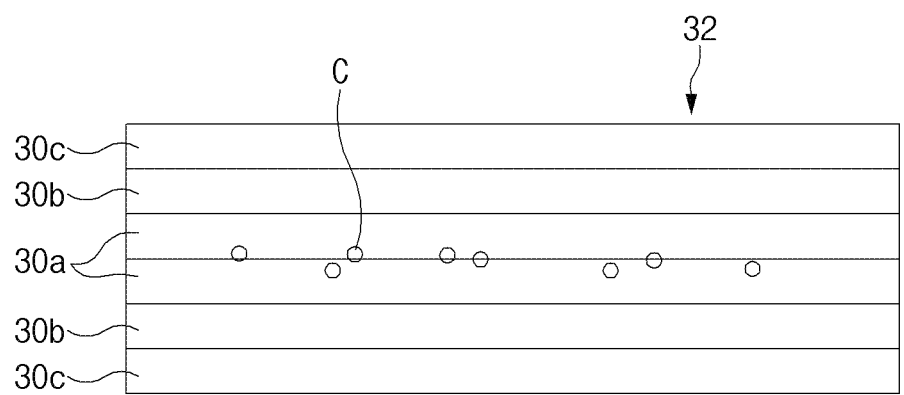
FIG. 8 is a cross-sectional view showing a state in which air bubbles are generated in a sealing portion in the sealing process for a secondary battery according to the first embodiment of the present invention.

Also, referring to FIG. 8, each of the upper case and the lower case has a stack structure in which a coating layer 30*a*, a metal layer 30*b*, and an insulating layer 30*c* are sequentially stacked from the inside of the battery case toward the outside.

Here, the sealing portion of the battery case is sealed by the sealing apparatus for a secondary battery according to the first embodiment of the present invention. Particularly, the sealing apparatus for a secondary battery according to the first embodiment of the present invention thermally fuses and seals the sealing portion of the battery case by using ultrasonic waves. Here, the sealing apparatus for a secondary battery according to the first embodiment of the present invention sets optimal conditions when generating an ultrasonic wave, and thus may seal the sealing portion of the battery case without failures.

Hereinafter, the sealing apparatus for a secondary battery according to the first embodiment of the present invention will be described in detail with reference to the accompanying drawings.

[Sealing Apparatus for a Secondary Battery According to the First Embodiment of the Present Invention]

Figure 2:
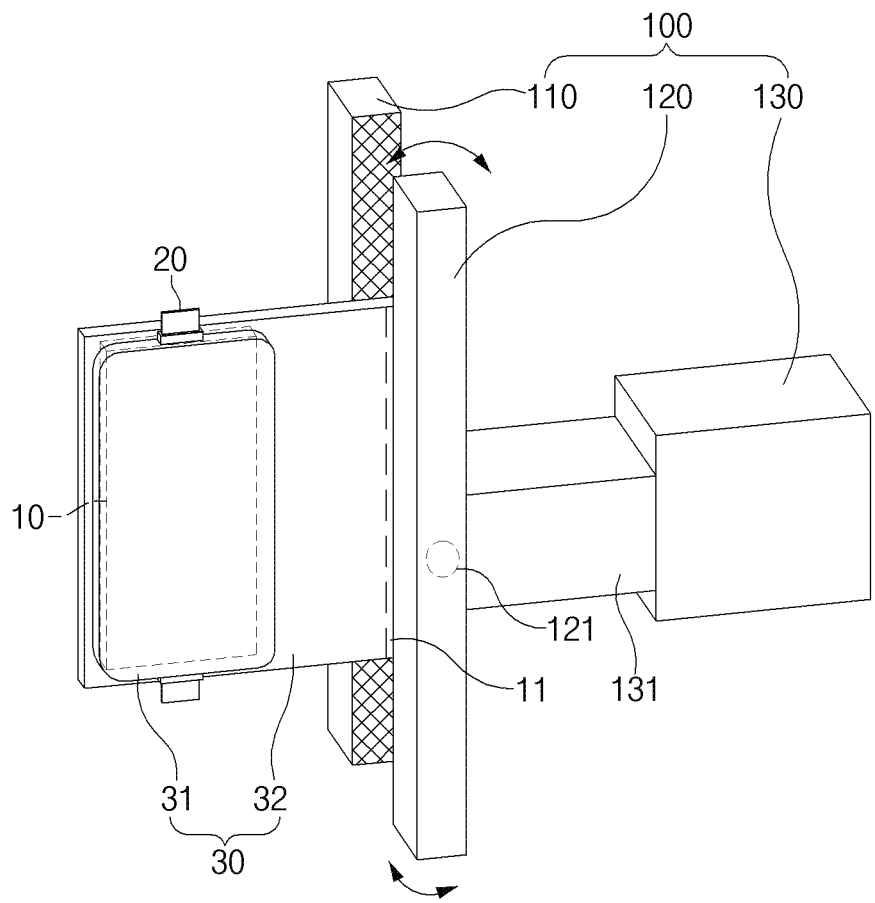
FIG. 2 is a perspective view illustrating a sealing apparatus for a secondary battery according to the first embodiment of the present invention.
Figure 3:
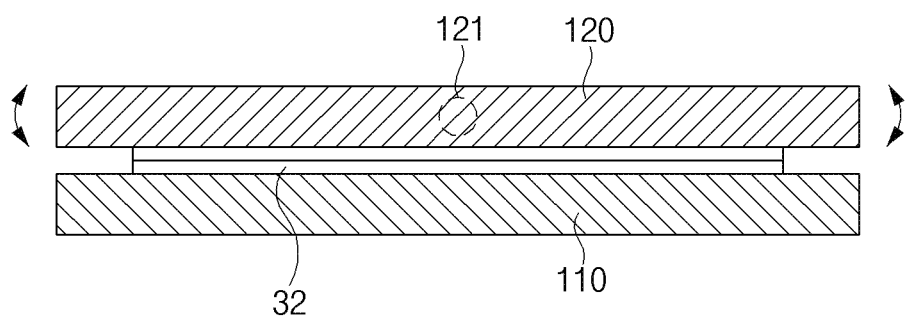
FIG. 3 is a cross-sectional view illustrating the sealing apparatus for a secondary battery according to the first embodiment of the present invention.
Figure 4:
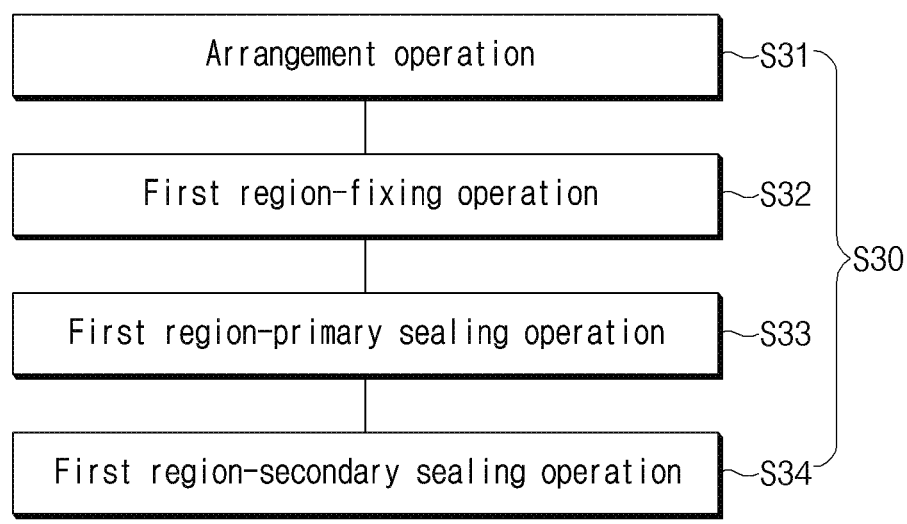
FIG. 4 is a flowchart showing a sealing process for a secondary battery according to the first embodiment of the present invention.
Figure 5:
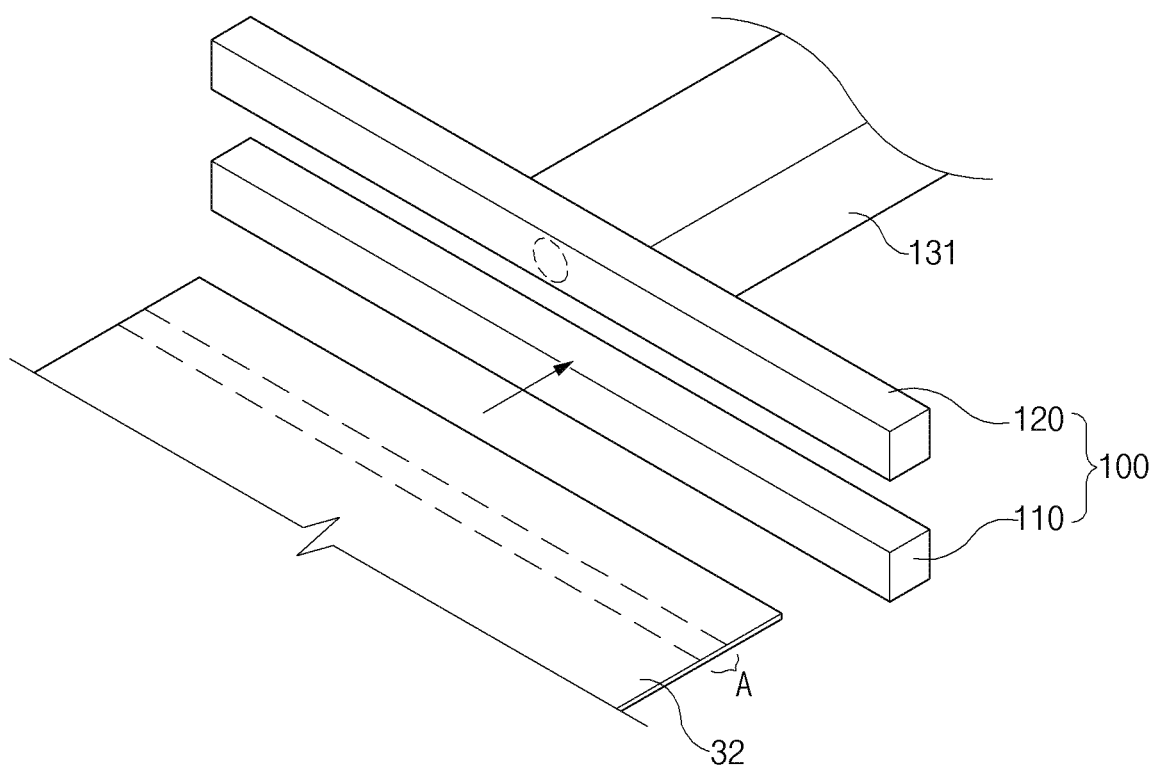
FIG. 5 is a perspective view showing an arrangement operation of the sealing process for a secondary battery according to the first embodiment of the present invention.
Figure 6:
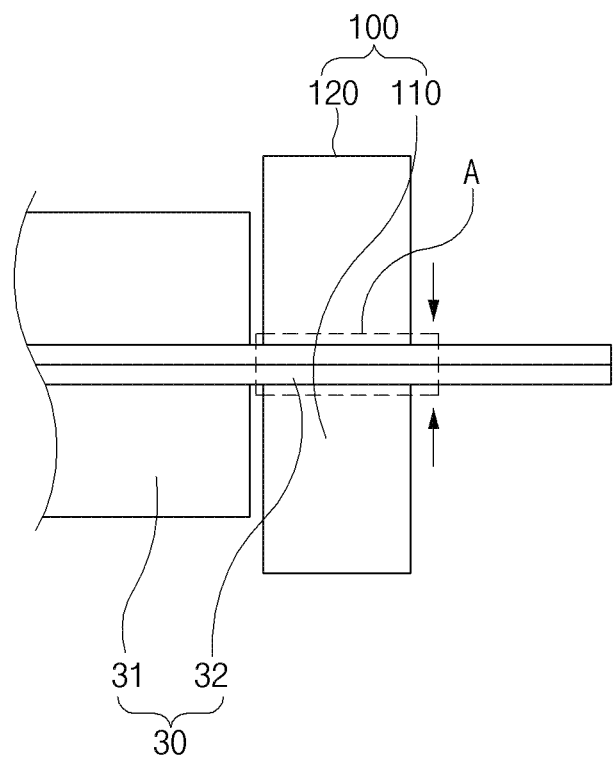
FIG. 6 is a side view showing a first region-fixing operation of the sealing process for a secondary battery according to the first embodiment of the present invention.
Figure 7:
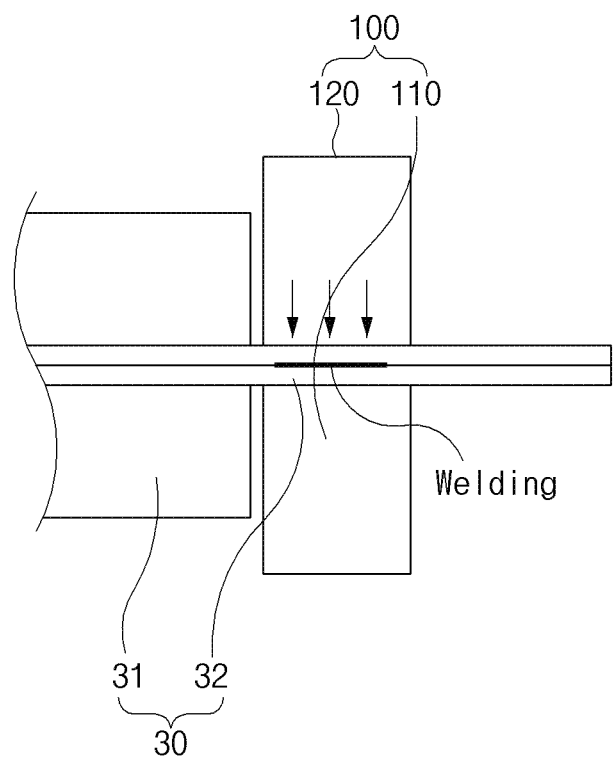
FIG. 7 is a side view showing a first region-sealing operation of the sealing process for a secondary battery according to the first embodiment of the present invention.

As illustrated in FIGS. 2 and 3, a secondary battery sealing apparatus 100 according to the first embodiment of the present invention comprises an anvil 110, on which the sealing portion 32 of the battery case 30 is disposed, and a horn 120, which heats and seals the sealing portion 32 disposed on the anvil 110 while the sealing portion is subjected to pressure.

That is, in the secondary battery sealing apparatus 100 according to the first embodiment of the present invention, the sealing portion 32 of the battery case 30 is disposed between the anvil 110 and the horn 120, and then, the sealing portion 32 is subjected to pressure and fixed through the anvil 110 and the horn 120. Next, when the ultrasonic wave is applied to the sealing portion 32 through the horn 120, a portion of the coating layer included in the sealing portion 32 is thermally fused. Accordingly, the sealing portion may be sealed.

As one example, the secondary battery sealing apparatus 100 according to the first embodiment of the present invention applies the ultrasonic wave to the first region A of the sealing portion 32 through the horn 120 at a set frequency and a set amplitude for a set time. Accordingly, uniformity of heat generated in the first region A of the sealing portion 32 may increase, and as a result, the first region A of the sealing portion 32 may be sealed without a failure.

Here, when the thickness of the coating layer 30*a* provided in the sealing portion 32 is 30 µm to 85 µm, the set frequency may be 10 kHz to 40 kHz, the set amplitude may be 5 µm to 50 µm, and the set time may be 0.1 seconds to 2.0 seconds.

As described above, when the secondary battery sealing apparatus 100 according to the first embodiment of the present invention seals the coating layer included in the sealing portion 32, the coating layer may be sealed without a failure by setting the ultrasonic welding conditions.

Meanwhile, the secondary battery sealing apparatus 100 according to the first embodiment of the present invention comprises a converter 130 having a booster 131 that transfers thermal energy to the horn 120. Here, the center of the horn 120 is rotatably coupled to the booster 131 through a hinge 121, and accordingly, both ends of the horn 120 rotate about the hinge 121. That is, as the horn 120 rotates when the sealing portion 32 is subjected to pressure through the anvil 110 and the horn 120, the entirety of the sealing portion 32 may be uniformly subjected to pressure through the anvil 110 and the horn 120, and as a result, the uniform ultrasonic wave may be applied to the entirety of the sealing portion. Thus, the sealing force may increase.

Hereinafter, a sealing process using the secondary battery sealing apparatus 100 according to the first embodiment of the present invention will be described.

[Sealing Process for a Secondary Battery According to the First Embodiment of the Present Invention]

As illustrated in FIGS. 4 to 9, a secondary battery sealing process (S30) according to the first embodiment of the present invention, which is to thermally fuse and seal the sealing portion 32 that extends along an edge surface of the battery case 30, comprises an arrangement operation (S31), a first region-fixing operation (S32), a first region-primary sealing operation (S33), and a first region-secondary sealing operation (S34).

Arrangement Operation

In the arrangement operation (S31), the first region A defined in the sealing portion 32 of the battery case 30 is disposed between the anvil 110 and the horn 120 of the sealing apparatus 100 for a secondary battery.

First Region-Fixing Operation

In the first region-fixing operation (S32), the first region A of the sealing portion 32 is pressed and fixed through the anvil 110 and the horn 120. Here, the horn 120 is coupled to the converter 130 so as to be rotatable left and right about the hinge 121. Accordingly, the horn 120 rotates according to an arrangement angle of the anvil 110, and as a result, pressure on the entire pressing surfaces of the anvil 110 and the horn 120 may be uniformized. Through this, the entire surface of the sealing portion 32 fixed between the anvil 110 and the horn 120 may be pressed with uniform force.

First Region-Primary Sealing Operation

In the first region-primary sealing operation (S33), the ultrasonic wave is generated in the first region A of the sealing portion 32 through the horn 120, and the first region A of the sealing portion 32 is thermally fused. Particularly, in the first region-primary sealing operation (S33), as the ultrasonic wave is applied through the horn 120 at the set frequency and the set amplitude for the set time, the first region A of the sealing portion 32 is thermally fused. That is, the horn 120 applies the ultrasonic wave to the coating layer included in the sealing portion 32. As a portion of the coating layer is melted and then solidified, the sealing portion 32 is sealed.

Meanwhile, the battery case 30 comprises an upper case and a lower case. As the accommodation groove of the upper case is connected to the accommodation groove of the lower case, the accommodation portion 31 for accommodating the electrode assembly 10 is formed. As the sealing surface of the upper case is connected to the sealing surface of the lower case, the sealing portion 32 for sealing the accommodation portion 31 is formed. Also, each of the upper case and the lower case has a structure in which the coating layer 30a, the metal layer 30b, and the insulating layer 30c are sequentially stacked from the inside of the battery case toward the outside.

Here, when the thickness of the coating layer 30a included in the sealing portion 32 is 30 µm to 85 µm, the set frequency, which is a first condition, may be 10 kHz to 40 kHz, the set amplitude, which is a second condition, may be 5 µm to 50 µm, and the set time, which is a third condition, may be 0.1 seconds to 2.0 seconds. Here, the amplitude of 5 µm to 50 µm is considered as 100%.

Meanwhile, when the frequency, which is the first condition, is less than or equal to 10 kHz, a large amount of time is required to melt the coating layer 30a included in the sealing portion 32. Also, when the frequency is greater than or equal to 40 kHz, the coating layer 30a included in the sealing portion 32 may be rapidly melted, but damage to the coating layer may also occur.

Also, when the set amplitude, which is the second condition, is equal to or less than 5 µm, the coating layer 30a included in the sealing portion 32 is not melted, or a large amount of time is required. Also, when the set amplitude is greater than or equal to 50 µm, the coating layer 30a included in the sealing portion 32 may be rapidly melted, but damage to the coating layer may also occur.

Also, when the set time, which is the third condition, is less than or equal to 0.1 seconds, the coating layer 30a included in the sealing portion 32 is not melted because the time for which the ultrasonic wave is applied thereto is short. Also, when the set time is greater than or equal to 2.00 seconds, the coating layer 30a included in the sealing portion 32 may be rapidly melted, but damage to the coating layer may also occur.

Figure 13:
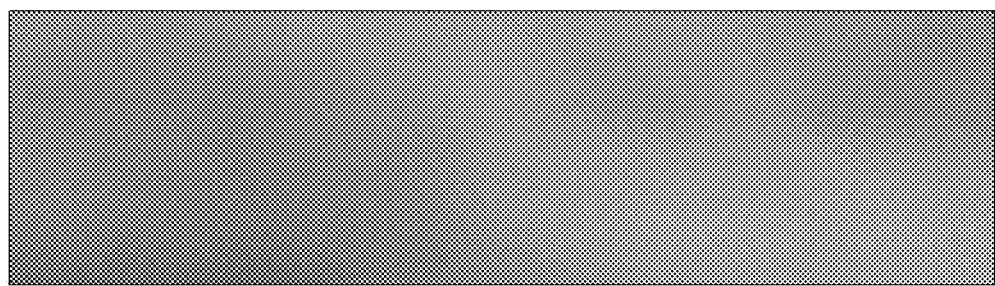
FIG. 13 is a picture in which an image of experimental results of Comparative Example 1 of FIG. 12 is captured.
Figure 14:
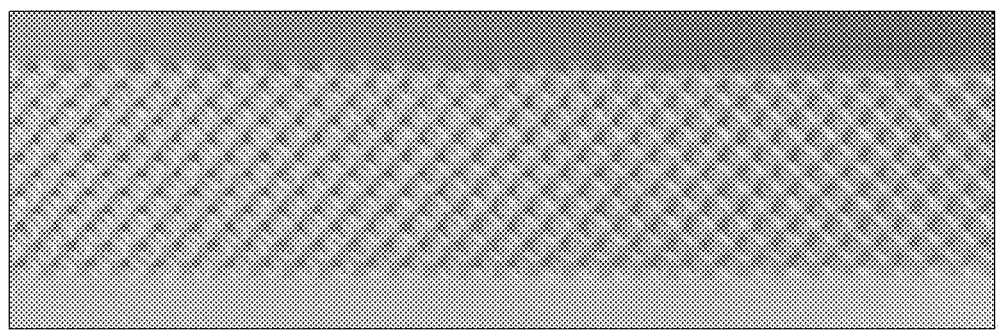
FIG. 14 is a picture in which an image of experimental results of Preparation Example 1 of FIG. 12 is captured.
Figure 15:
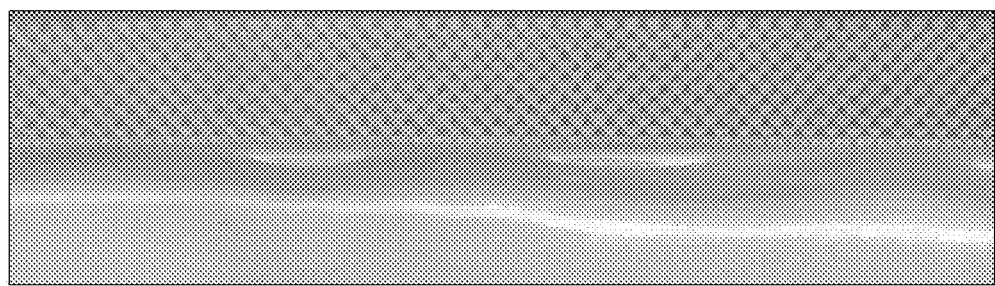
FIG. 15 is a picture in which an image of experimental results of Preparation Example 2 of FIG. 12 is captured.

As one example, in a case where the thickness of the coating layer 30a included in the sealing portion 32 is 35 µm to 80 µm, when the ultrasonic wave frequency is set to 10 kHz or 40 kHz, the amplitude is set to 100%, and the time is set to 0.1 seconds or 2.0 seconds, a sealing effect of the sealing portion becomes excellent (see experimental pictures of FIGS. 14 and 15). Meanwhile, when the ultrasonic wave frequency is 15 kHz, the amplitude is 100%, and the time is less than or equal to 0.1 seconds, heat is not uniformly transferred to the coating layer of the sealing portion 32, and thus, the coating layer is not sufficiently melted. Accordingly, sealing failure may occur (see an experimental picture of FIG. 13). Meanwhile, when the ultrasonic wave frequency is 35 kHz, the amplitude is 50%, and the time is 0.1 seconds, heat is not uniformly transferred to the coating layer of the sealing portion 32, and thus, the coating layer is not sufficiently melted (see an experimental picture of FIG. 16).

Thus, in the first region-primary sealing operation (S33), the set frequency, which is the first condition, is set to 10 kHz to 40 kHz, the set amplitude, which is the second condition, is set to 5 µm to about 50 µm, and the set time, which is the third condition, is set to 0.1 seconds to 2.0 seconds. Accordingly, the uniformity of heat transfer may be enhanced, and as a result, the first region A of the sealing portion 32 may be uniformly sealed without failure.

Here, as illustrated in FIG. 8, air bubbles C are generated in the sealing portion 32 as the coating layer 30a of the sealing portion 32 is melted in the first region-primary sealing operation (S33). The first region-secondary sealing operation (S34) may be further performed to eliminate the air bubbles C generated in the coating layer 30a of the sealing portion 32.

That is, after the first region-primary sealing operation (S33), the first region-secondary sealing operation (S34) is further performed to secondarily apply an ultrasonic wave to the first region A of the sealing portion 32 through the horn 120.

First Region-Secondary Sealing Operation

Figure 9:
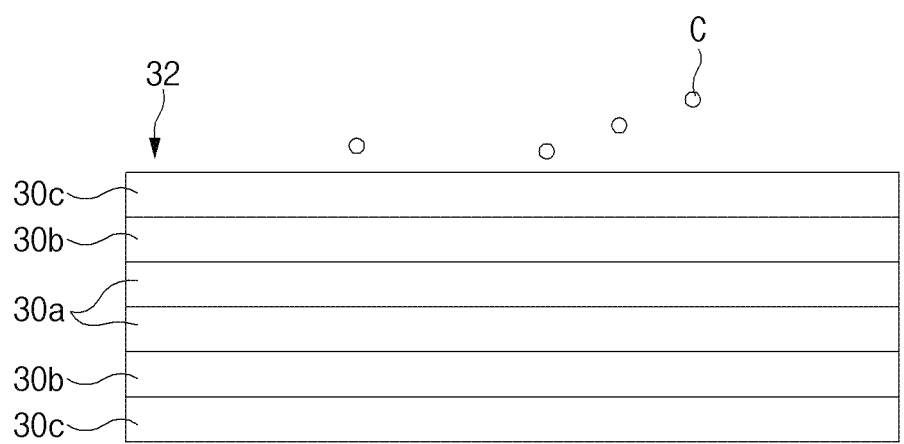
FIG. 9 is a cross-sectional view showing a state in which the air bubbles are eliminated in the sealing portion in the sealing process for a secondary battery according to the first embodiment of the present invention.

As illustrated in FIG. 9, the first region-secondary sealing operation (S34) is to secondarily seal the sealing portion, and at the same time, to eliminate the air bubbles generated in the sealing portion in the first region-primary sealing operation. That is, in the first region-secondary sealing operation (S34) after the first region-primary sealing operation (S33), the ultrasonic wave is secondarily applied to the first region A of the sealing portion 32 through the horn 120, and the first region A of the sealing portion 32 is secondarily thermally fused.

Here, the first region-secondary sealing operation (S34) is performed under the same ultrasonic wave frequency and set time as the first region-primary sealing operation (S33) but under an amplitude reduced by 40% to 60%, preferably, 50%.

That is, in the first region-secondary sealing operation (S34), the ultrasonic wave frequency, which is the first condition, is set to 10 kHz to 40 kHz, the set amplitude, which is the second condition, is set to 40% to 60% of the amplitude set in the first region-primary sealing operation (S33), and the set time, which is the third condition, is set to 0.1 seconds to 2.0 seconds.

As described above, in the first region-secondary sealing operation (S34), optimal sealing conditions comprising the first to third conditions are set. Next, the ultrasonic wave is used to generate frictional heat in the sealing portion 32. Thus, the air bubbles C generated in the sealing portion 32 are guided and gradually discharged to the outside, and as a result, the air bubbles C generated in the sealing portion 32 may be effectively eliminated.

Thus, the secondary battery sealing process (S30) according to the first embodiment of the present invention comprises the arrangement operation (S31), the first region-fixing operation (S32), the first region-primary sealing operation (S33), and the first region-secondary sealing operation (S34), and thus, the optimal sealing conditions may be set. Accordingly, the uniformity of heat transferred to the sealing portion may be enhanced, and as a result, the sealing portion may be sealed without failure. Particularly, the air bubbles generated in the sealing portion may be effectively eliminated, and thus, the productivity may increase.

Hereinafter, in describing another embodiment of the present invention, components having the same functions as those in the foregoing embodiment are given the same reference numerals, and their duplicated description will be omitted.

[Secondary Battery Manufacturing Method According to a Second Embodiment of the Present Invention]

Figure 10:
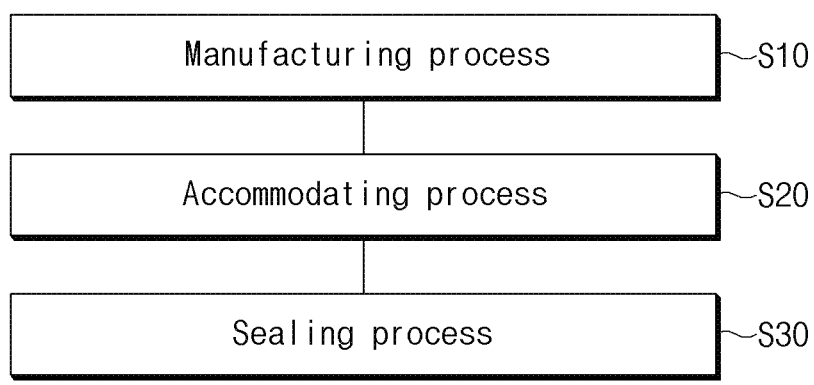
FIG. 10 is a flowchart showing a secondary battery manufacturing method according to a second embodiment of the present invention.

As illustrated in FIG. 10, a secondary battery manufacturing method according to a second embodiment of the present invention comprises: a manufacturing process (S10) of stacking an electrode and a separator and manufacturing an electrode assembly 10; an accommodating process (S20) of coupling an electrode lead 20 to an electrode tab of the electrode assembly 10 and accommodating the electrode assembly 10 in a pouch-type battery case 30 in a state in which a front end of the electrode lead 20 is drawn to the outside; and a sealing process (S30) of thermally fusing and sealing a sealing portion 32 that extends from an edge surface of the battery case 30.

Here, the sealing process (S30) comprises: an arrangement operation (S31) of disposing the sealing portion 32, which extends along the edge surface of the battery case 30, between an anvil 110 and a horn 120; a first region-fixing operation (S32) of pressing and fixing a first region A of the sealing portion 32 through the anvil 110 and the horn 120; and a first region-primary sealing operation (S33) of applying an ultrasonic wave to the first region A of the sealing portion 32 through the horn 120 at a set frequency and a set amplitude for a set time, thereby thermally fusing the first region A of the sealing portion 32.

Meanwhile, the set frequency may be 10 kHz to 40 kHz, the set amplitude may be 5 μm to 50 μm, and the set time may be 0.1 seconds to 2.0 seconds.

Meanwhile, after the first region-primary sealing operation (S33), a first region-secondary sealing operation (S34) is further provided to secondarily apply an ultrasonic wave to the first region of the sealing portion through the horn. The first region-secondary sealing operation is performed under the same ultrasonic wave frequency and set time as the first region-primary sealing operation but under an amplitude reduced by 40% to 60%.

Meanwhile, the sealing process (S30) has the same processes as the secondary battery sealing process (S30) described above according to the first embodiment of the present invention, and accordingly, duplicated descriptions will be omitted.

Thus, the secondary battery manufacturing method according to the second embodiment of the present invention may manufacture a secondary battery having improved sealing force.

[Sealing Process for a Secondary Battery According a Third Embodiment of the Present Invention]

In a secondary battery sealing process (S30) according to the third embodiment of the present invention, an operation of further sealing a second region B of the sealing portion 32 included in the battery case 30 is further performed after the first region-primary sealing operation or the first region-secondary sealing operation of the secondary battery sealing process (S30) described above according to the first embodiment of the present invention is completed. Accordingly, sealing force of the sealing portion 32 included in the battery case 30 may significantly increase.

As one example, the secondary battery sealing process (S30) according to the third embodiment of the present invention comprises an arrangement operation (S31), a first region-fixing operation (S32), a first region-primary sealing operation (S33), a first region-secondary sealing operation (S34), a second region-fixing operation (S35), and a second region-sealing operation (S36).

Here, the arrangement operation (S31), the first region-fixing operation (S32), the first region-primary sealing operation (S33), and the first region-secondary sealing operation (S34) have been described in detail in the secondary battery sealing process (S30) according to the first embodiment, and thus, detailed description thereof will be omitted herein.

Figure 11:
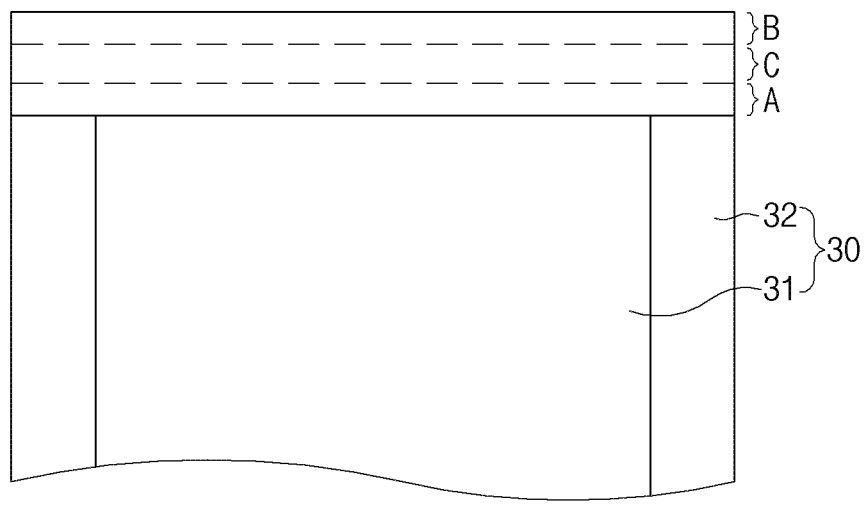
FIG. 11 is a plan view illustrating a secondary battery sealing process according to a third embodiment of the present invention.

Meanwhile, in the secondary battery sealing process (S30) according to the third embodiment of the present invention, the sealing portion 32 included in the battery case 30 is divided into three regions along the width direction of the sealing portion as illustrated in FIG. 11, and sealing is performed. That is, a first region A inside the sealing portion 32 is sealed firstly, a second region B outside the sealing portion 32 is sealed secondly, and a third region C between the first region A and the second region B is sealed finally.

Here, the first region A and the second region B are sealed under the same setting, and the third region C is sealed at a higher temperature and for a longer time than the first region A and the second region B.

Second Region-Fixing Operation

In the second region-fixing operation (S35), the second region B of the sealing portion 32, which is spaced apart from the first region A, is disposed on the anvil 110 and the horn 120, and then, the second region B of the sealing portion 32 is pressed and fixed through the anvil 110 and the horn 120.

Second Region-Sealing Operation

In the second region-sealing operation (S36), as an ultrasonic wave is applied to the second region B of the sealing portion 32 through the horn 120 at a set frequency and a set amplitude for a set time, the second region B of the sealing portion 32 is thermally fused. Accordingly, the second region B of the sealing portion 32 may be sealed.

Here, the second region-sealing operation (S36) comprises a second region-primary sealing operation and a second region-secondary sealing operation.

The second region-primary sealing operation primarily seals the second region of the sealing portion at the same conditions as the first region-primary sealing operation (S33) described above. That is, with regard to the sealing conditions of the second region-primary sealing operation, the set frequency is 10 kHz to 40 kHz, the set amplitude is 5 μm to 50 μm, and the set time is 0.1 seconds to 2.0 seconds.

The second region-secondary sealing operation secondarily seals the second region B of the sealing portion at the same conditions as the first region-secondary sealing operation (S34) described above. Here, the second region-secondary sealing operation has the same sealing conditions as the second region-primary sealing operation with regard to the ultrasonic wave frequency and set time, but is performed under an amplitude reduced by 40% to 60%, preferably, 50%. Here, air bubbles generated in the second region B of the sealing portion may also be eliminated together, and as a result, the second region of the sealing portion may be sealed without failure.

Thus, in the secondary battery sealing process (S30) according to the third embodiment of the present invention, the first and second regions of the sealing portion may be sealed without failure, and as a result, the sealing force of the secondary battery may increase.

Meanwhile, the secondary battery sealing process (S30) according to the third embodiment of the present invention further comprises a third region-fixing operation (S37) and a third region-sealing operation (S38).

Third Region-Fixing Operation

In the third region-fixing operation (S37), the third region C of the sealing portion positioned between the first region A and the second region B is pressed and fixed through the anvil 110 and the horn 120 after the second region-sealing operation.

Third Region-Sealing Operation

In the third region-sealing operation (S38), as an ultrasonic wave is applied to the third region C of the sealing portion 32 through the horn 120 at a set frequency and a set amplitude for a set time, the third region C of the sealing portion 32 is thermally fused.

Here, the ultrasonic wave frequency, amplitude, and time of the third region-sealing operation (S38) are set to differ from the ultrasonic wave frequency, amplitude, and time of the first region-primary sealing operation.

That is, the ultrasonic wave frequency, amplitude, and time of the third region-sealing operation (S38) are set to be higher than the ultrasonic wave frequency, amplitude, and time of the first region-primary sealing operation. Accordingly, the third region of the sealing portion, which is positioned between the first region and the second region, may be effectively melted, and thus, the sealing force may increase.

Particularly, in the third region-sealing operation (S38), the ultrasonic wave time of the third region is set to 1 second to 2 seconds. Accordingly, the entirety of the third region may be stably melted, and as a result, the sealing force may increase.

Thus, in the secondary battery sealing process (S30) according to the third embodiment of the present invention, the third region of the sealing portion is further sealed, and thus, the sealing force of the secondary battery may significantly increase.

Experimental Example

As shown in the table of FIG. 12, four secondary batteries comprising electrode assemblies, electrode leads, and battery cases are prepared. The four secondary batteries are the same products. Also, in the four secondary batteries, sealing portion of the secondary batteries are sealed under different sealing conditions. Here, coating layers provided in the sealing portions have the thickness of 30 μm to 85 μm. Also, the amplitude of 5 μm to 50 μm is set to 100%.

Comparative Example 1

In Comparative Example 1, a first region A of a sealing portion included in a secondary battery is sealed by generating an ultrasonic wave at a frequency of 10 kHz to 40 kHz and an amplitude of 100% for 0.1 seconds or less, and then, an image of the surface of the sealing portion is captured. As a result, a picture as shown in FIG. 13 may be obtained.

Preparation Example 1

In Preparation Example 1, a first region A of a sealing portion included in a secondary battery is sealed by generating an ultrasonic wave at a frequency of 10 kHz to 40 kHz and an amplitude of 100% for 0.35 seconds, and then, an image of the surface of the sealing portion is captured. As a result, a picture as shown in FIG. 14 may be obtained.

Preparation Example 2

In Preparation Example 2, a first region A of a sealing portion included in a secondary battery is sealed by generating an ultrasonic wave at a frequency of 10 kHz to 40 kHz and an amplitude of 100% for 2.0 seconds, and then, an image of the surface of the sealing portion is captured. As a result, a picture as shown in FIG. 15 may be obtained.

Comparative Example 2

Figure 16:
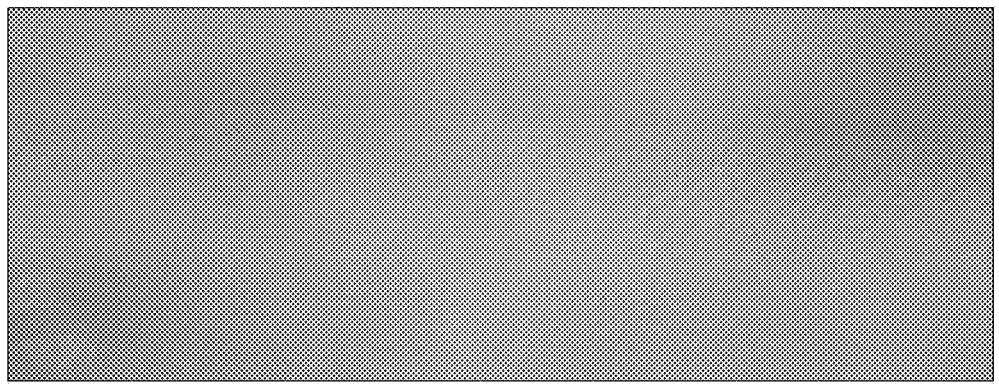
FIG. 16 is a picture in which an image of experimental results of Comparative Example 2 of FIG. 12 is captured.

In Comparative Example 2, a first region A of a sealing portion included in a secondary battery is sealed by generating an ultrasonic wave at a frequency of 10 kHz to 40 kHz and an amplitude of 50% of the amplitude of Preparation Example 1 for 0.35 seconds, and then, an image of the surface of the sealing portion is captured. As a result, a picture as shown in FIG. 16 may be obtained.

Experimental Results

Referring to FIG. 13 of Comparative Example 1, it may be confirmed that the sealing portion has no protrusion mark of the horn or anvil. Through this, it may be seen that the first region A of the sealing portion is not stably melted because a frequency and time of an ultrasonic wave applied to the first region A of the sealing portion are small. As a result, it may be confirmed that sealing failure occurs. Here, the measurement result of adhesion strength in a coating layer of the sealing portion is 0.0 N/mm.

Referring to FIG. 14 of Preparation Example 1, it may be clearly confirmed that the sealing surface has protrusion marks of the horn or anvil. Through this, it may be seen that the first region A of the sealing portion is stably melted and sealed. As a result, it may be seen that the sealing portion is sealed without failure. Here, the measurement result of adhesion strength in a coating layer of the sealing portion is 5.0 N/mm.

Referring to FIG. 15 of Preparation Example 2, it may be confirmed that a portion of the sealing surface has protrusion marks of the horn or anvil. However, the adhesion strength is less than that of Preparation Example 1 due to over melting, but the adhesion strength may be higher than those of the comparative examples. Thus, the sealing portion may be sealed without failure. Meanwhile, the measurement result of adhesion strength in a coating layer of the sealing portion is 3.0 N/mm.

Referring to FIG. 16 of Comparative Example 2, it may be confirmed that the sealing surface has no protrusion mark of the horn or anvil. Through this, it may be seen that the first region A of the sealing portion is not melted because the amplitude and time of the ultrasonic wave are sufficient but the amplitude is insufficient. As a result, it may be confirmed that sealing failure occurs. Meanwhile, the measurement result of adhesion strength in a coating layer of the sealing portion is 0.0 N/mm.

Thus, as shown in the experimental results, when the sealing portion is sealed by using the ultrasonic wave in the secondary battery sealing process according to the first embodiment of the present invention, the frequency is set to 10 kHz to 40 kHz, the amplitude is set to 50% to 100%, and the time is set to 0.1 seconds to 2.0 seconds. Thus, the sealing portion may be stably sealed.

The scope of the present invention is defined by the appended claims rather than the detailed description, and various embodiments derived from the meaning and scope of the claims and their equivalent concepts are also possible.

DESCRIPTION OF THE SYMBOLS

10: Electrode assembly
20: Electrode lead
30: Battery case
31: Accommodation portion
32: Sealing portion
100: Secondary battery sealing apparatus
110: Anvil
120: Horn
121: Hinge
130: Converter
131: Booster

The invention claimed is:

1. A method of sealing a secondary battery, the method comprising:
    disposing a sealing portion that extends along an edge surface of a battery case between an anvil and a horn;
    pressing and fixing a first region of the sealing portion between the anvil and the horn; and applying a first ultrasonic wave to the first region of the sealing portion through the horn at a first frequency and a first amplitude for a first time, thereby thermally fusing the first region of the sealing portion, wherein the sealing portion has a stack structure that comprises a coating layer, a metal layer, and an insulating layer in a direction from an inside of the battery case toward an outside of the battery case, and a thickness of the coating layer is 30 µm to 85 µm.

2. The method of claim 1, wherein the first frequency is 10 kHz to 40 kHz, the first amplitude is 5 µm to 50 µm, and the first time is 0.1 seconds to 2.0 seconds.

3. The method of claim 1, further comprising, after the applying of the first ultrasonic wave, applying a second ultrasonic wave to the first region of the sealing portion through the horn, wherein the second ultrasonic wave is applied at the first frequency and for the first time but at a second amplitude that is 40% to 60% less than the first amplitude.

4. The method of claim 1, wherein the horn is rotatable left or right toward the sealing portion and is coupled to a converter comprising a booster, and the horn presses an entirety of the first region of the sealing portion with a uniform pressure.

5. The method of claim 1, further comprising, after the applying of the first ultrasonic wave: pressing and fixing a second region of the sealing portion, which is spaced apart from the first region, between the anvil and the horn; and applying a second ultrasonic wave to the second region of the sealing portion through the horn at a second frequency and a second amplitude for a second time, thereby thermally fusing the second region of the sealing portion.

6. The method of claim 5, wherein the second ultrasonic wave is applied at the first frequency, at the first amplitude, and for the first time.

7. The method of claim 5, further comprising, after the applying of the second ultrasonic wave:

pressing and fixing a third region of the sealing portion, which is positioned between the first region and the second region, between the anvil and the horn; and applying a third ultrasonic wave to the third region of the sealing portion through the horn at a third frequency and a third amplitude for a third time, thereby thermally fusing the third region of the sealing portion.

8. The method of claim 7, wherein the third frequency, the third amplitude, and the third time are different from the first frequency, the first amplitude, and first time, respectively.

9. The method of claim 8, wherein the third frequency, the third amplitude, and the third time of the third region are higher than the first frequency, the first amplitude, and the first time, respectively.

10. A method for manufacturing a secondary battery, the method comprising:

manufacturing an electrode assembly by stacking an electrode and a separator;

accommodating the electrode assembly in a pouch-type battery case; and thermally fusing and sealing a sealing portion that extends along an edge surface of the battery case, wherein the thermally fusing and sealing comprises:

disposing the sealing portion between an anvil and a horn;

pressing and fixing a first region of the sealing portion between the anvil and the horn; and applying a first ultrasonic wave to the first region of the sealing portion through the horn at a first frequency and a first amplitude for a first time, thereby thermally fusing the first region of the sealing portion, wherein the sealing portion has a stack structure that comprises a coating layer, a metal layer, and an insulating layer in a direction from an inside of the battery case toward an outside of the battery case, and a thickness of the coating layer is 30 µm to 85 µm.

11. The method of claim 10, wherein the first frequency is 10 kHz to 40 kHz, the first amplitude is 5 µm to 50 µm, and the first time is 0.1 seconds to 2.0 seconds.

12. The method of claim 10, wherein the thermally fusing and sealing further comprises, after the applying of the first ultrasonic wave, applying a second ultrasonic wave to the first region of the sealing portion through the horn, wherein the second ultrasonic wave is applied at the first frequency and for the first time but at a second amplitude that is 40% to 60% less than the first amplitude.

13. The method of claim 10, wherein the thermally fusing and sealing further comprises, after the applying of the first ultrasonic wave:

pressing and fixing a second region of the sealing portion, which is spaced apart from the first region, between the anvil and the horn; and applying a second ultrasonic wave to the second region of the sealing portion through the horn at a second frequency and a second amplitude for a second time, thereby thermally fusing the second region of the sealing portion.

14. The method of claim 13, wherein the thermally fusing and sealing further comprises, after the applying of the second ultrasonic wave:

pressing and fixing a third region of the sealing portion, which is positioned between the first region and the second region, between the anvil and the horn; and applying a third ultrasonic wave to the third region of the sealing portion through the horn at a third frequency and a third amplitude for a third time, thereby thermally fusing the third region of the sealing portion.

\* \* \* \* \*